United States Patent [19]

Kitagawa et al.

[11] Patent Number: 4,717,235
[45] Date of Patent: Jan. 5, 1988

[54] FLEXIBLE TYING MEMBER FOR THEFTPROOF DEVICE

[75] Inventors: Tadao Kitagawa, Kamifukuoka; Yutaka Kosuge, Sayama; Yoichiro Noda, Miyazaki; Tomosaburo Sato, Kawagoe, all of Japan

[73] Assignees: Honda Giken Kogyo K.K., Tokyo; Kabushiki Kaisha Honda Rokku, Miyazaki; Kokoku Control Cable Kabushiki Kaisha, Saitama, all of Japan

[21] Appl. No.: 438,341

[22] Filed: Nov. 1, 1982

[30] Foreign Application Priority Data

Nov. 16, 1981 [JP] Japan .................. 56-183389
Nov. 16, 1981 [JP] Japan .................. 56-183390
Nov. 17, 1981 [JP] Japan .................. 56-184284

[51] Int. Cl.⁴ .................................. G02B 6/44
[52] U.S. Cl. .................. 350/96.23; 350/96.20
[58] Field of Search ............ 350/96.20, 96.21, 96.23

[56] References Cited

U.S. PATENT DOCUMENTS 3,660,590  5/1972  Conant ................ 350/96.23
4,278,835  7/1981  Jackson ............... 350/96.23
4,379,289  4/1983  Peek .................. 350/96.20

FOREIGN PATENT DOCUMENTS 1580089 12/1977 United Kingdom .

Primary Examiner—William L. Sikes
Assistant Examiner—Robert E. Wise
Attorney, Agent, or Firm—Arthur L. Lessler

[57] ABSTRACT

A flexible tying member for a theftproof device which is adapted to give warning in response to a change in a photo signal transmitted in an optical fiber extending through the flexible tying member. The flexible tying member has a first layer including the optical fiber and at least one electric wire connected to at least one photoelectric element, and a second layer including a reinforcing member. The flexible tying member has a coaxial structure having an inner layer formed by the above first layer, and an outer layer formed by the above second layer, or a parallel structure in which the above first and second layers longitudinally extend parallel with each other.

6 Claims, 10 Drawing Figures

FLEXIBLE TYING MEMBER FOR THEFTPROOF DEVICE

BACKGROUND OF THE INVENTION

This invention relates to a theftproof device, and more particularly to a flexible tying member forming part of a theftproof device and through which an optical fiber extends.

A theftproof device for vehicles such as motorcycles has been proposed by the assignee of the present application, which uses a flexible tying member such as a wire cable, through which an optical fiber extends. The proposed theftproof device is used in such a manner that a vehicle, which is to be protected from theft, is tied to a solid structure such as an electric pole, by means of the above flexible tying member, while a photo signal is permanently transmitted through the optical fiber. When the flexible tying member is cut in two to cause interruption of the transmission of the photo signal through the optical fiber, the cutting of the flexible tying member is detected in a photoelectric manner to actuate a warning device to give warning.

Such flexible tying member with an optical fiber incorporated therein should desirably have sufficient strength so as to withstand frequent use. Further, it should have a simple structure such that it can be manufactured at moderately low costs.

OBJECT AND SUMMARY OF THE INVENTION

It is an object of the invention to provide a flexible tying member for theftproof devices, which has an optical fiber extending therethrough, and which has sufficient strength, and has a simple structure enough to permit manufacturing at low costs.

A theftproof device, to which the present invention is applicable, comprises an elongate flexible tying member, an optical fiber longitudinally extending through the flexible tying member, a pair of photoelectric elements arranged at opposite ends of the optical fiber, and means responsive to a change in an electric signal generated by one of the photoelectric elements, which corresponds to a change in a photo signal generated by the other photoelectric element and transmitted in the optical fiber, for performing a warning function. The elongate flexible tying member comprises a first layer including the optical fiber and at least one electric wire longitudinally extending through the tying member and electrically connected to at least one of the above photoelectric elements, and a second layer including a reinforcing member longitudinally extending through the tying member.

In a preferred form, the flexible tying member has a coaxial structure in which the first layer is arranged at the diametric center of the tying member and extending along the axis of same, and the second layer is concentrically disposed around the first layer. In another preferred form, the flexible tying member has a parallel structure in which the first and second layers are longitudinally fitted through a flexible hollow tubular member in a manner extending parallel with each other.

The above and other objects, features and advantages of the invention will be more apparent form the ensuing detailed description taken in connection with the accompanying drawings.

DETAILED DESCRIPTION

Figure 1:
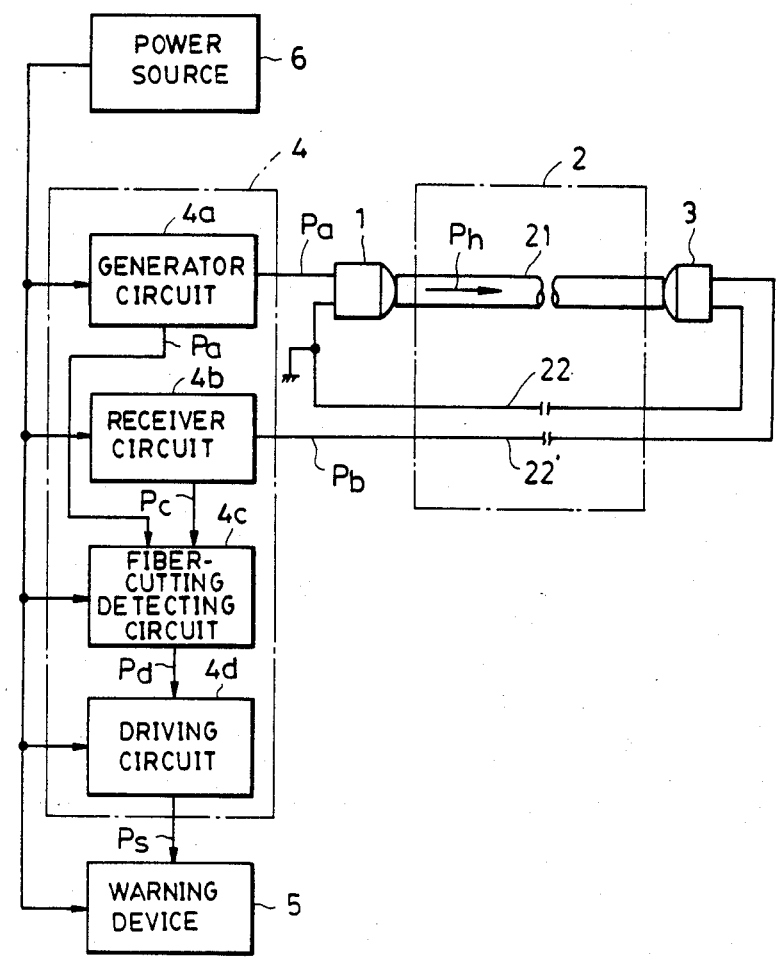
FIG. 1 is a block diagram showing an example of an electrical circuit for use in a theftproof device to which the flexible tying member according to the present invention is applicable.

The flexible tying member according to the present invention will now be described in detail with reference to the drawings which illustrate several embodiments thereof. In the drawings, like reference characters designate like or corresponding parts throughout all the views.

Referring first to FIG. 1, there is illustrated an electrical circuit, by way of example, for use in a theftproof device to which the flexible tying member of the present invention is applicable. In FIG. 1, reference numeral 1 designates a light emission element 1 as a photoelectric element, such as a light emission diode, which is arranged at one end of an optical fiber 21 longitudinally extending through a flexible tying member 2 which is preferably formed of a wire cable, as herienlater described in detail. A light receiving element 3 as another photoelectric element, such as a phototransistor, is arranged at the other end of the optical fiber 21. The light emission element 1 and the light receiving element 3 are electrically connected to an electrical circuit 4. The electrical circuit 4 is adapted to supply an electric signal to the light emission element 1 and generate a warning signal in cooperation with a warning device 5 connected to the output of the former, in response to an output of the light receiving element 3. A power source 6 is connected to the electrical circuit 4 and the warning device 5 to supply them with electric power. In the illustrated example, the light receiving element 3 and the electrical circuit 4 are connected together by way of lead wires 22 and 22' which are windingly disposed in the flexible tying member 2 of the inventon, as hereinlater described.

The electrical circuit 4 comprises a generator circuit 4a a receiver circuit 4b, a fiber-cutting detecting circuit 4c, and a driving circuit 4d. The generator circuit 3a can be formed by a pulse generator, which is adapted to generate an electric pulse signal Pa having a predetermined constant pulse repetition period. The light emission element 1, which is adapted to convert an electric signal into a corresponding photo signal, is operable in response to the pulse signal Pa to generate a corresponding photo pulse signal Ph. This photo pulse signal Ph is transmitted through the optical fiber 21. The light receiving element 3, which is adapted to convert a photo signal into a corresponding electric signal, is operable in response to the photo pulse signal Ph inputted thereto through the optical fiber 21 to generate a corresponding electric pulse signal Pb. The receiver circuit 4b is arranged to receive and detect the signal Pb supplied thereto from the light receiving element 3 to generate a corresponding electric pulse signal Pc. The fiber-cutting detecting circuit 4c is arranged to be supplied with the pulse signals Pa and Pc, respectively, from the generator circuit 4a and the receiver circuit 4b for detection of disconnection or cutting of the optical fiber 21, depending upon the input signals. For instance, it can be adapted to determine fulfillment of an "AND" condition of the levels of the signals Pa and Pc to generate an abnormality-indicative signal Pd when it determines that the AND condition is not fulfilled. The driving circuit 4d, which is adapted and arranged to actuate the warning device 5, is responsive to the input signal Pd to generate a driving signal Ps. The warning device 5, which can be formed of a buzzer, is responsive to the input driving signal Ps to give an alarm.

Figure 2:
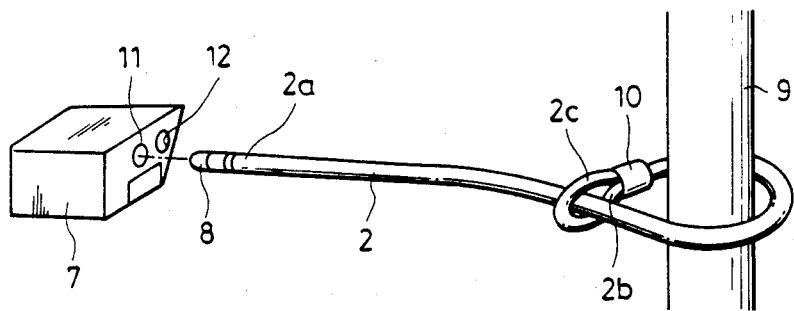
FIG. 2 is a schematic view illustrating, by way of example, a manner of using a theftproof device to which the flexible tying member of the present invention is applied.
Figure 3:
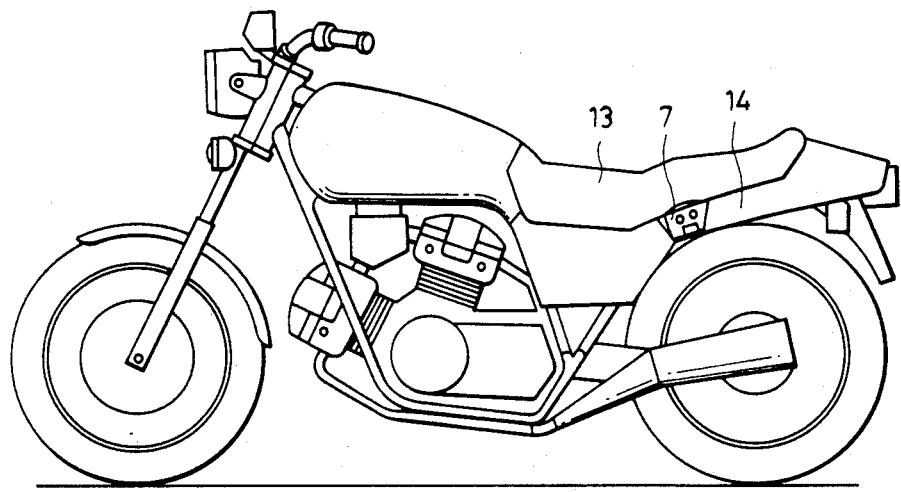
FIG. 3 is a schematic side view of a motorcycle on which the main body of the theftproof device appearing in FIG. 2 is mounted.

FIG. 2 schematically illustrates a theftproof device to which the flexible tying member, the electrical circuit, etc. in FIG. 1 are applied. The theftproof device has a casing 7 in which are accommodated the electrical circuit 4, the warning device 5 and the power source 6, all appearing in FIG. 1. The casing 7 is rigidly mounted on a vehicle, e.g. on a motorcycle, as shown in FIG. 3, at a predetermined location, for instance, at a side wall of a rear cowl 14 under a seat 13.

The flexible tying member 2 carries at its one end 2a a plug 8 secured thereon, in which are accommodated the light emission element 1 in FIG. 1 and a connector, neither of which is shown in FIG. 2. The flexible tying member 2 also carries at its other end 2b a caulking metal holder 10 rigidly secured on the same end in a caulked manner. The metal holder 10 accommodates a capsule, not shown, in which the light receiving element 3 in FIG. 1 is supportedly disposed in alignment with an associated end of the optical fiber 21. The end 2b of the flexible tying member 2 and the capsule are held together by the metal holder 10, in a manner forming a loop 2c.

To tie a vehicle to an electric pole or the like by means of the flexible tying member of FIG. 2, the flexible tying member 2 is wound round an electric pole 9 or the like, then the plug 8 is passed through the loop 2c, and then the same plug is locked into a locking hole 11 formed in the casing 7. In FIG. 2, reference numeral 12 designates a lock for preventing disengagement of the plug 8 form the locking hole 11.

Details of the flexible tying member 2 according to the invention, which is used in the above manner, will now be described with reference to FIGS. 4 through 10. In the following embodiments, the flexible tying member 2 is formed of a wire cable as a most preferable material, and is, therefore, hereinafter called "the lock wire cable"

Figure 4:
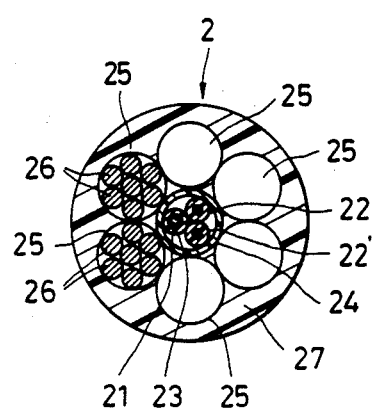
FIG. 4 is a cross-sectional view illustrating the flexible tying member according to an embodiment of the present invention.
Figure 5:
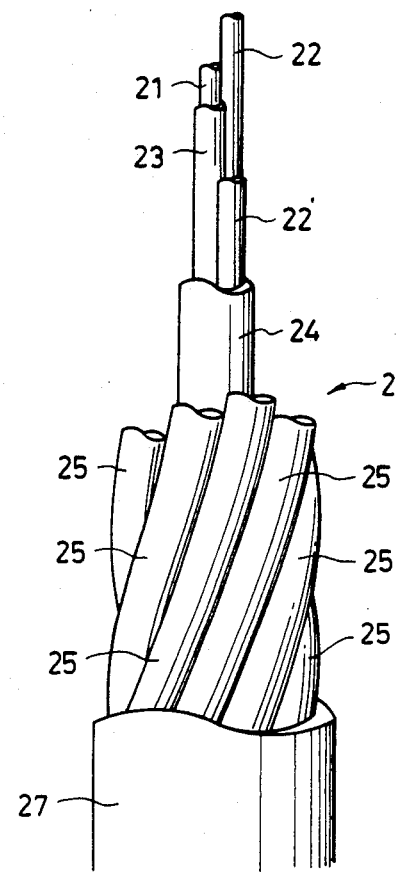
FIG. 5 is a fragmentary side and broken view illustrating the flexible tying member of FIG. 4.

Referring first to FIGS. 4 and 5, there is illustrated a first embodiment of the lock wire cable 2 of the invention. An optical fiber 21, which is coated with a protective layer 23 formed of a synthetic resin such as polyvinyl chloride and polyethylene, is arranged at the diametric center of the lock wire cable 2, together with two lead wires 22 and 22' as electric conductors. The optical fiber 2 and the lead wires 22 and 22' are longitudinally fitted through a flexible tube 24 formed of a synthetic resin such as polyethylene, as a hollow tubular member, in a manner extending parallel with each other, forming a first layer together with the tube 24. The first layer is thus arranged at the diametric center of the lock wrie cable 2 and longitudinally extends along the axis of same. Concentrically disposed or wound around the tube 24 along its whole length are a plurality of, e.g. six strands 25, each formed of a plurality of, e.g. seven twisted steel wires 26. These strands 25 serve as a reinforcing member. The strands 25 are coated with another protective layer 27 formed of a synthetic resin such as polyvinyl chloride, as an outer wall member, which fills gaps between the individual strands 25. A second layer is thus formed by the strands 25 and the protective layer 27.

As noted above, the optical fiber 21 is arranged at the diametric center of the lock wire cable 2 in a manner enclosed by the tube 24, the strands 25, etc. so that it is fully protected from being damaged or easily cut due to external disturbances. Further, the optical fiber 21 extends along the axis of the lock wire cable 2 in a streamline manner without any unnecessary curved portion, and accordingly can transmit light or a photo pulse signal Ph in FIG. 1 through a minimum possible distance from an end to the opposite end. In the other words, the total length of the optical fiber 21 can be reduced to keep the transmission loss of light transmitted therethrough at a very small value. Also, having no tortuous or curved portion, the optical fiber 21 can have sufficient light transmission efficiency, i.e. a large light transmission amount per unit length.

Although in the arrangement of FIGS. 4 and 5, the optical fiber 21 and the lead wires 22 and 22' longitudinally extend parallel with each other, they may be twisted together with a large pitch, according to necessity.

Figure 6:
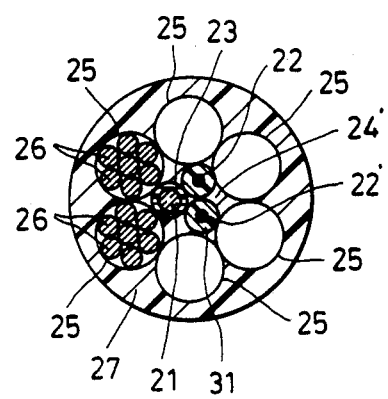
FIG. 6 is a cross-sectional view illustrating the flexible tying member according to a further embodiment of the invention.
Figure 7:
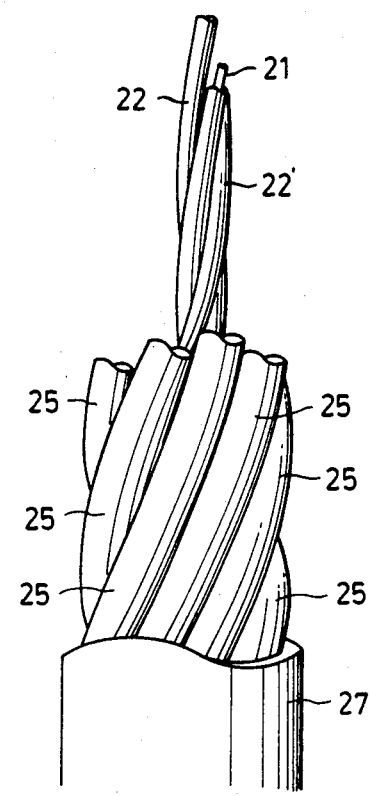
FIG. 7 is a fragmentary side and broken view illustrating the flexible tying member of FIG. 6.

FIGS. 6 and 7 illustrate a second embodiment of the lock wire cable of the invention. An optical fiber 21, which is coated with a protective layer 23 formed of a material similar to the one in the first embodiment, is arranged at the diametric center of the lock wire cable 2, together with two lead wires or electric conductors 22 and 22', similar to the ones in the first embodiment. The optical fiber 21 and the lead wires 22 and 22' are twisted together with a large pitch. The optical fiber 21 and the lead wires 22 and 22' are coated with a synthetic resin material 24' such as polyvinyl chloride as a coating material to form an integral core as a first layer together with the latter. The first layer is thus arranged at the diametric center of the lock wire cable 2 and longitudinally extends along the axis of same. Concentrically disposed or wound around the above core or first layer along its whole length are a plurality of, e.g. six strands 25, each formed of a plurality of, e.g. seven twisted steel wires 26, similar to the ones in the first embodiment. The strands 25 are coated with a protective layer 27 formed of a synthetic resin similar to the one in the first embodiment, as an outer wall member, which also fills gaps between the individual strands 25, exactly, radially outer peripheral surfaces of same, forming a second layer together with the latter.

The strands 25 are wound onto the above core or first layer when the synthetic resin material 24' is still in a state softened by heat, that is, before it sets up. Therefore, the synthetic resin material 24' completely fills gaps between the strands 25, the optical fiber 21, and the lead wires 22 and 22', and accordingly the outer peripheral surface of the core or first layer has a shape or profile corresponding to that of the inner peripheral surfaces of the strands 25. The lead wires 22 and 22' are each coated with an insulating material 31 formed of polyvinyl chloride, polyethylene, or the like and having a relatively large thickness to avoid shorting between the lead wires and the strands 25.

The use of the synthetic resin material 24' makes it possible to fully utilize spaces between the optical fiber 21, the lead wires 22 and 22' and the strands 25 in a manner completely filling the gaps therebetween, which permits reducing the outer diameter of the lock wire cable 2. Further, the optical fiber 21 and the lead wires 22 and 22' are fully protected from being damaged or easily cut due to external disturbances, enabling the lock wire cable to withstand frequent use. In addition, ends of the lead wires 22 and 22' can be easily taken out from the respective ends of the lock wire cable 2, facilitating wiring operation for electrical connection of the ends of the lead wires with associated connectors.

Althrough in the embodiment in FIGS. 6 and 7, the optical fiber 21 and the lead wires 22 and 22' are twisted together with a large pitch, they may be disposed in the wire to extend substantially parallel with each other.

Figure 8:
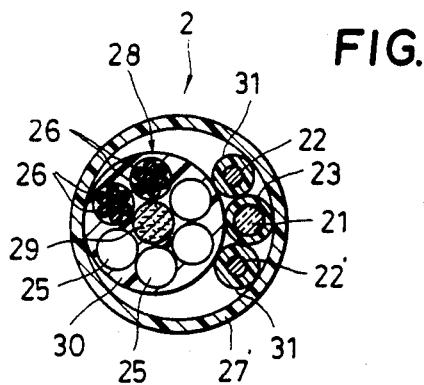
FIG. 8 is a cross-sectional view illustrating the flexible tying member according to a still further embodiment of the invention.
Figure 9:
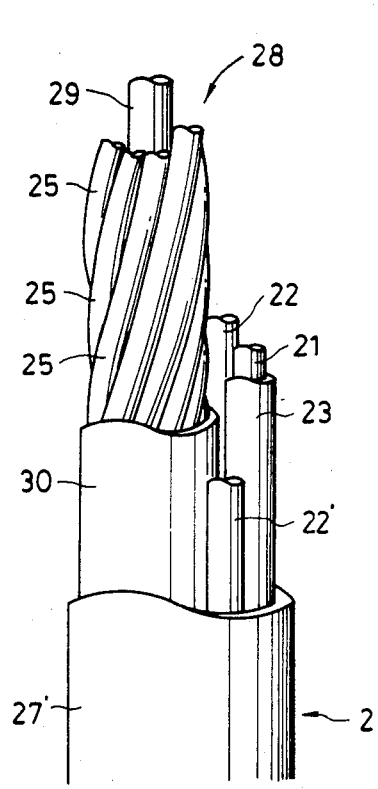
FIG. 9 is a fragmentary side and broken view illustrating the flexible tying member of FIG. 8.

FIGS. 8 and 9 illustrate a still further embodiment of the lock wire cable 2 of the invention. According to this embodiment, a first layer is formed by an optical fiber 21 coated with a synthetic resin layer 23 similar to the one in the first embodiment, and two lead wires or electric conductors 22 and 22' extending parallel with the optical fiber 21. This first layer is longitudinally fitted through a flexible tube 27' as another hollow tubular member, which is formed of synthetic resin such as polyvinyl chloride, together with a reinforcing member 28 forming a second layer, in a manner extending parallel with the reinforcing member 28. The reinforcing member 28 is formed by a core 29 formed of a string of hemp yarn or the like, disposed along the axis of the member 28, a plurality of, e.g. six strands 25, each formed of a plurality of, e.g. six twisted steel wires 26, wound around the core 29, and an outer wall layer 30 formed of a synthetic resin such as polyvinyl chloride, coating the strands 25. The lead wires 22 and 22' are each coated with an insulating material 31 similar to the one in the second embodiment.

Since the optical fiber 21, the lead wires 22 and 22', and the reinforcing member 28 are all longitudinally fitted through the flexible tube 27' together in a manner extending parallel with each other, the lock wire cable 2 is simple in structure, and can therefore be manufactured with ease and at low costs. Further, the longitudinal arrangement of the optical fiber 21 in the flexible tube 27' along with the reinforcing member 28, etc. can make it possible to reduce the total effective length of the optical fiber 21 to keep the transmission loss of light therethrough at a very small value, and also to prevent tortuosity of the optical fiber 21 which can cause a reduction in the light transmission efficiency.

Figure 10:
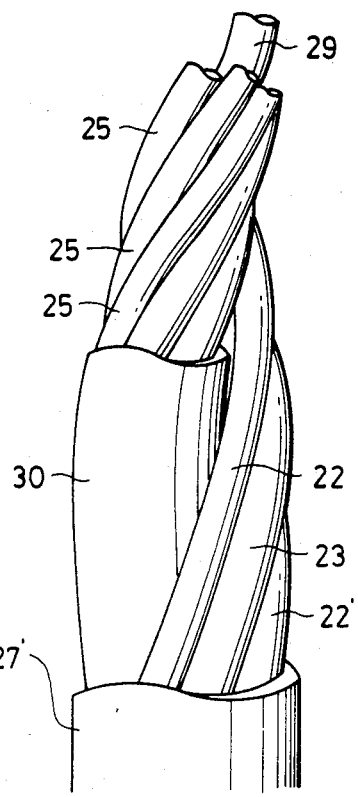
FIG. 10 is a fragmentary side and broken view illustrating a modification of the flexible tying member of FIGS. 8 and 9.

Although in the embodiment of FIGS. 8 and 9, the optical fiber 21, the lead wires 22 and 22', and the reinforcing member 28 extend parallel with each other, they may alternatively be twisted together with a very large pitch, as shown in FIG. 10.

According to any of the embodiments described above, which all use a reinforcing member disposed along the optical fiber, the lock wire cable has sufficient strength, and is simple in structure. Therefore, it can be manufactured with ease and at low costs.

Moreover, the lead wires 22 and 22' are not limited in number to two as in the illustrated embodiments, but only a single such lead wire may be used, as a positive conductor, for instance, and in such a case, the strands 25 formed of steel wires may be arranged to conduct electric current therein, for use as one of the electric conductors, as a negative conductor, for instance.

The structure of the wire cable as the reinforcing member is not limitative, but many modifications and alterations are possible in respect of the numbers of the strands 25 and the twisted steel wires 26 and the manner of twisting them. Alternatively, the wire cable may be formed by a plurality of wire ropes twisted together. That is, the structure and size of the wire cable may be selected from a wide variety of structures and sizes, depending upon the required outer diameter, strength, etc. of th lock wire cable 2.

What is claimed is:

1. An elongate flexible tying member having an optical fiber longitudinally extending through said flexible tying member and a pair of photoelectric elements arranged at opposite ends of said optical fiber, for use in a theftproof device including means responsive to a change in an electrical signal generated by one of said photoelectric elements, which corresponds to a change in a photo signal generated by the other of said photoelectric elements and transmitted in said optical fiber, for performing a warning function, said flexible tying member further comprising:
    a first layer including said optical fiber and at least one electric wire which longitudinally extends through said flexible tying member and is electrically connected to at least one of said photoelectric elements, said optical fiber and at least one electric wire being arranged around the axis of the tying member,
    said first layer being disposed at a diametric center of said flexible tying member and extending along an axis thereof,
    said first layer including a coating material coating said optical fiber and said at least one electric wire; and
    a second layer including a reinforcing member wound around said first layer and longitudinally extending through said flexible tying member,
    said reinforcing member of said second layer comprising a plurality of strands, each strand comprising a plurality of twisted steel wires,
    said second layer being coaxially arranged around an outer peripheral portion of said first layer and substantially in contact with the first layer;
    said coating material filling gaps between said optical fiber, said at least one electric wire, and said reinforcing member.

2. The flexible tying member as claimed in claim 1 wherein said second layer has at least an outer peripheral portion thereof formed by a synthetic resin material.

3. The flexible tying member as claimed in claim 1 wherein said optical fiber and said at least one electric wire of said first layer longitudinally extend parallel with each other.

4. The flexible tying member as claimed in claim 1 wherein said optical fiber and said at least one electric wire of said first layer are twisted together.

5. The flexible tying member as claimed in claim 1 wherein said reinforcing member is formed of an electrically conductive material, and electrically connected to one of said photoelectric elements to also serve as another one of said at least one electric wire.

6. An elongate flexible tying member having an optical fiber longitudinally extending through said flexible tying member and a pair of photoelectric elements arranged at opposite ends of said optical fiber, for use in a theftproof device including warning means responsive to a change in an electrical signal generated by one of said photoelectric elements, which corresponds to a change in a photo signal generated by the other of said photoelectric elements and transmitted in said optical fiber, for performing a warning function, one of said photoelectric elements comprising a light source and the other of said photoelectric elements comprising a light receptor, said flexible tying member further comprising:

a loop formed at one end of said flexible tying member;

connection means at the other end of said flexible tying member for detachably connecting said other end to a warning means;

a first layer including said optical fiber and two electric wires which longitudinally extend through said flexible tying member from said connection means, said first layer being disposed at a diametric center of said flexible tying member and extending along an axis thereof, said optical fiber and electric wires being arranged around the axis of the tying member, said electric wires being electrically connected to the one of said photoelectric elements at said one end of said flexible tying means adjacent said loop, said first layer including a coating material coating said optical fiber and said electric wires; and a second layer including a reinforcing member wound around said first layer and longitudinally extending through said flexible tying member, said reinforcing member of said second layer comprising a plurality of strands, each strand comprising a plurality of twisted steel wires, said second layer being coaxially arranged around an outer peripheral portion of said first layer and substantially in contact with the first layer;

said coating material filling gaps between said optical fiber, said at least one electric wire, and said reinforcing member.

* * * * *